United States Patent
Meyer et al.

(10) Patent No.: US 8,741,992 B2
(45) Date of Patent: Jun. 3, 2014

(54) POLYCARBONATE COMPOSITIONS WITH PHENOLICALLY SUBSTITUTED TRIAZINE DERIVATIVE

(75) Inventors: Alexander Meyer, Düsseldorf (DE); Claus Rüdiger, Krefeld (DE); Ulrich Blaschke, Krefeld (DE); Michael Wagner, Moers (DE)

(73) Assignee: Bayer Intellectual Property GmbH (DE)

( * ) Notice: Subject to any disclaimer, the term of this patent is extended or adjusted under 35 U.S.C. 154(b) by 0 days.

(21) Appl. No.: 13/513,787

(22) PCT Filed: Dec. 1, 2010

(86) PCT No.: PCT/EP2010/068629
§ 371 (c)(1), (2), (4) Date: Aug. 22, 2012

(87) PCT Pub. No.: WO2011/067282
PCT Pub. Date: Jun. 9, 2011

(65) Prior Publication Data
US 2013/0005873 A1 Jan. 3, 2013

(30) Foreign Application Priority Data
Dec. 5, 2009 (DE) .................. 10 2009 057 231

(51) Int. Cl.
C08G 63/02 (2006.01)
C08G 64/00 (2006.01)

(52) U.S. Cl.
USPC .................. 524/91; 524/83; 524/84

(58) Field of Classification Search
USPC .................. 524/91
See application file for complete search history.

(56) References Cited

U.S. PATENT DOCUMENTS

| | | | |
|---|---|---|---|
| 4,185,009 A | 1/1980 | Idel et al. | |
| 4,707,393 A | 11/1987 | Vetter | |
| 4,962,142 A * | 10/1990 | Migdal et al. | 524/100 |
| 5,235,026 A | 8/1993 | Wulff et al. | |
| 5,367,044 A | 11/1994 | Rosenquist | |
| 5,672,645 A | 9/1997 | Eckel et al. | |
| 5,846,659 A | 12/1998 | Lower et al. | |
| 5,998,116 A | 12/1999 | Hayoz et al. | |
| 6,013,704 A | 1/2000 | Hayoz et al. | |
| 6,060,543 A | 5/2000 | Bolle et al. | |
| 6,228,973 B1 | 5/2001 | McCloskey et al. | |
| 6,613,869 B1 | 9/2003 | Horn et al. | |
| 2002/0083641 A1 | 7/2002 | Leppard et al. | |
| 2002/0120092 A1 | 8/2002 | Kratschmer et al. | |
| 2002/0173566 A1 | 11/2002 | Haese et al. | |
| 2003/0236327 A1 | 12/2003 | Leppard et al. | |
| 2004/0164446 A1 | 8/2004 | Goossens et al. | |
| 2005/0250915 A1 | 11/2005 | Heuer et al. | |
| 2008/0081896 A1 | 4/2008 | Heuer | |

FOREIGN PATENT DOCUMENTS

| | | |
|---|---|---|
| DE | 1031512 B | 6/1958 |
| DE | 2500092 A1 | 7/1976 |
| DE | 4240313 A1 | 6/1994 |
| DE | 19739748 A1 | 3/1998 |
| DE | 19739781 A1 | 3/1998 |
| DE | 19739797 A1 | 3/1998 |
| DE | 19943642 A1 | 3/2001 |
| DE | 10135795 A1 | 4/2002 |
| EP | 0110221 A2 | 6/1984 |
| EP | 0110238 A2 | 6/1984 |
| EP | 0517044 A2 | 12/1992 |
| EP | 0640655 A2 | 3/1995 |
| EP | 0716919 A2 | 6/1996 |
| EP | 825226 A2 | 2/1998 |
| EP | 1308084 A1 | 5/2003 |
| EP | 1506249 A1 | 2/2005 |
| EP | 1582549 A1 | 10/2005 |
| GB | 1476108 A | 6/1977 |
| WO | WO-96/28431 A1 | 9/1996 |
| WO | WO-99/55471 A1 | 11/1999 |
| WO | WO-99/55772 A1 | 11/1999 |
| WO | WO-01/62821 A1 | 8/2001 |
| WO | WO-02/26862 A1 | 4/2002 |
| WO | WO-02/077087 A1 | 10/2002 |
| WO | WO-2005/113639 A1 | 12/2005 |
| WO | WO-2008/037364 A1 | 4/2008 |

OTHER PUBLICATIONS

International Search Report for PCT/EP2010/068629 mailed Feb. 16, 2011.

* cited by examiner

Primary Examiner — Terressa Boykin
(74) Attorney, Agent, or Firm — Drinker Biddle & Reath LLP

(57) ABSTRACT

Disclosed is a composition comprising polycarbonate and from 0.0001 weight % to 0.1000 weight % of 2-(2,4-dihydroxy)phenyl-4,6-di(4-phenyl)phenyl-1,3,5-triazine.

12 Claims, No Drawings

POLYCARBONATE COMPOSITIONS WITH PHENOLICALLY SUBSTITUTED TRIAZINE DERIVATIVE

RELATED APPLICATIONS

This application is a national stage application (under 35 U.S.C. §371) of PCT/EP2010/068629, filed Dec. 1, 2010, which claims benefit of German Patent Application No. 10 2009 057, filed Dec. 5, 2009.

The present invention relates to compositions containing polycarbonate and specific amounts of a triazine, to their preparation and use in the production of mouldings, in particular of sheets and tubes of optical quality, by an extrusion process.

Polymeric moulding compositions containing triazine compounds are known per se and have frequently been described in the literature. Accordingly, such compounds are used infer alia in the stabilisation of organic polymers, in particular against damage by UV radiation. The provision of such UV protective properties is important in particular for materials which are used in applications where they are subject to weather-induced stress.

DE 197 39 797, for example, describes stabiliser mixtures containing compounds of the 2,4,6-triphenyl-1,3,5-triazine and 2-(4-phenylphenyl)-4,6-diaryl-1,3,5-triazine type. The mixtures are used for stabilising organic materials against damage by light, oxygen or heat.

WO 99/55471 A describes the production of UV-absorbing coatings on organic or inorganic substrates by a plasma process using hydroxyphenyl-s-triazines as UV absorbers.

In WO 96/28431 A, biphenyl-substituted triazines are disclosed as stabilisers for organic polymers against damage by light, oxygen or heat, for example for use in textile fibre materials or sun creams.

Ring-opening metathesis polymerisations with oligomeric UV absorbers, which also include those having triazine structures, are disclosed in WO 01/62821 A1.

DE 197 39 748 A1 describes a colour-photographic recording material based on a plurality of layers, at least one of the mentioned layers containing UV absorbers having a triazine structure.

US-A 2003/0236327 provides transparent articles of small thickness made of polyolefins, polyesters or polyamides. The mentioned polymers are stabilised against the action of light, oxygen, heat or the action of aggressive chemicals by the use of UV absorbers of the hydroxyphenyltriazine type.

DE 197 39 781 A 1 discloses compounds of the hydroxyphenyltriazine type having cyclic glycidyl ether substituents, a synergistic stabiliser mixture containing these compounds, and the use thereof for stabilising organic material.

EP 825 226 A2 describes polycarbonate compositions with low film formation which contain a combination of substituted aryl phosphite having a melting point of 170° C. and a substituted triazine having a melting point of at least 140° C. The required amounts of triazine, from 1 to 7 wt. %, preferably from 3 to 4 wt. %, are markedly greater than the amounts (from 0.0001 wt. % to 0.1000 wt. %) which are claimed in the present invention.

The use of 2-(2,4-dihydroxy)phenyl-4,6-di(4-phenyl)phenyl-1,3,5-triazine in materials for extrusion as well as the combination of specific concentrations of 2-(2,4-dihydroxy) phenyl-4,6-di(4-phenyl)phenyl-1,3,5-triazine and further benzotriazole- and/or triazine-based UV absorbers for materials for extrusion are not described in the prior art.

Examples of applications of thermoplastic plastics in which there is particular weather-induced stress are sheets of thermoplastic plastics for architectural glazing. Different types of sheet; such as solid sheets, multi-wall sheets, twin-wall sheets, corrugated sheets, profiles, multi-layer laminates or other forms, can play a role here.

When the known low molecular weight additives based on triazine are used, however, there is the problem that these substances have a ready tendency to outgassing under processing conditions, that is to say to escape from the material to be processed, and can thus lead, for example, to films on processing machines. Thus, in the production of solid or multi-wall sheets, for example, deposits of such low molecular weight substances on the calender rollers can occur. This problem is frequently intensified by additional low molecular weight components such as oligomers, which come from the polymer to be processed, and, for example, demoulding agents and flame retardants. In particular in the case of materials which require high UV protection, such as, for example, in extruded articles such as solid or twin-wall sheets, the proportion and quality of the UV absorber plays a decisive role.

The object was, therefore, to develop a polycarbonate composition which has a low tendency to outgassing, or film formation, and, as well as being suitable for injection-moulded articles, is suitable in particular for extruded articles such as solid or multi-wall sheets, or for correspondingly coextruded sheets. UV absorbers which have high effectiveness in terms of UV protection combined with low volatility should be suitable especially for this purpose. Wholly surprisingly, however, it has been possible to show that, in polycarbonate compositions, the addition according to the invention of from 0.0001 wt. % to 0.1000 wt. % 2-(2,4-dihydroxy)phenyl-4,6-di(4-phenyl)phenyl-1,3,5-triazine reduces the evaporation tendency and accordingly the film formation as compared with polycarbonate without additive, even though the triazine according to the invention is not a polymeric compound. From 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine accordingly acts as emission inhibitor. It has further been found, surprisingly, that specific polycarbonate compositions containing specific concentrations of particular UV absorbers protect the polycarbonate particularly effectively against UV rays and at the same time exhibit an extremely low tendency to outgassing, or film formation. Even if UV absorbers of particularly low volatility were used, the composition according to the invention could not be assumed to have such a low evaporation tendency.

The compositions according to the invention are accordingly particularly suitable for the production of thermoplastically processable, that is to say extruded and injection-moulded mouldings, and in particular of extruded mouldings such as, for example, sheets or tubes, of good optical quality and weathering stability. Within the scope of the present invention, good optical quality means the film formation on the mouldings as a result of the evaporation tendency of additives before, during and after weathering. In particular, it is also possible to produce transparent compositions having high degrees of transmission, >75% and >80%, and mouldings according to the invention therefrom.

In the present invention, all percent by weight data (wt. %)—both hereinabove and hereinbelow—are based on the percentage of the weight of the total composition.

The present invention accordingly relates to compositions containing polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine, particularly preferably from 0.001 wt. % to 0.070 wt. % 2-(2,4-dihydroxy)phenyl-4,6-di(4-phenyl)phenyl-1,3,5-triazine, to the use thereof in the production of mouldings, in particular in the production of sheets and tubes of high optical quality, by an extrusion process.

The present invention relates further to compositions containing polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine as well as a further UV absorber from the group of the benzotriazoles and/or triazines in amounts of from 0.0001 wt. % to 10.0000 wt. %, which are used in the production of mouldings, in particular in the production of sheets and tubes of high optical quality by an extrusion process.

In particular, the composition is suitable for use in the production of coextruded layers on such mouldings.

The present invention relates further to a process for the preparation of the composition according to the invention, characterised in that polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine and optionally a further UV absorber from the group of the benzotriazoles and/or triazines in amounts of from 0.0001 wt. % to 10.0000 wt. % are combined, mixed and homogenised, the homogenisation in particular preferably being carried out in the melt under the action of shear forces. The combination and mixing before the melt homogenisation are optionally carried out using powder premixtures. It is also possible to use premixtures which have been prepared from solutions of the mixture components in suitable solvents, homogenisation optionally being carried out in solution and the solvent subsequently being removed.

Within the context of the present invention it has been found that compositions containing polycarbonate and 2-(2,4-dihydroxy)phenyl-4,6-di(4-phenyl)phenyl-1,3,5-triazine in specific ratios lead to materials which have a low evaporation tendency and at the same time are protected in an outstanding manner against the influence of damaging UV rays. In particular, in the presence of further UV absorbers according to the invention, such as benzotriazoles and other triazines, the total evaporation is reduced as compared with the formulations without 2-(2,4-dihydroxy)phenyl-4,6-di(4-phenyl)phenyl-1,3,5-triazine. These compositions are suitable in particular for substrate materials for extruded articles such as sheets or films or as substrate materials for coextruded layers.

Accordingly, the present invention relates to compositions containing polycarbonate and preferably from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine. The present invention relates further to compositions containing polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine as well as a further UV absorber from the group of the benzotriazoles and/or triazines in amounts of from 0.0001 wt. % to 10.0000 wt. %.

The present invention relates further to the use of compositions containing polycarbonate and from 0.0001 wt. % to 0.10 wt. %, preferably from 0.001 wt. % to 0.05 wt. %, 2-(2,4-dihydroxy)phenyl-4,6-di(4-phenyl)phenyl-1,3,5-triazine in the production of mouldings, in particular in the production of sheets and tubes of high optical quality by an extrusion process, as well as to the mouldings and their production themselves.

The present invention relates also to processes for the preparation of a composition according to the invention, characterised in that polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine are combined, mixed and homogenised, the homogenisation in particular preferably being carried out in the melt under the action of shear forces. The combination and mixing before the melt homogenisation are optionally carried out using powder premixtures. It is also possible to use premixtures which have been prepared from solutions of the mixture components in suitable solvents, homogenisation optionally being carried out in solution and the solvent subsequently being removed.

A process according to the invention for the preparation of the composition according to the invention can also be characterised in that polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine as well as a further UV absorber from the group of the benzotriazoles and/or triazines in amounts of from 0.0001 wt. % to 10.0000 wt. % are combined and mixed, optionally in solvents, homogenisation optionally being carried out and the solvent being removed.

Suitable polycarbonates for the preparation of the plastics composition according to the invention are all known polycarbonates. They are homopolycarbonates, copolycarbonates and thermoplastic polyester carbonates.

The polycarbonates which are suitable have mean molecular weights $\overline{M}_w$ from 10,000 to 50,000, preferably from 10,000 to 40,000 and in particular from 16,000 to 40,000, determined by measuring the relative solution viscosity in dichloromethane or in mixtures of equal amounts by weight of phenol/o-dichlorobenzene calibrated by light scattering.

The preparation of the polycarbonates takes place preferably by the interfacial process or the melt transesterification process, which are described many times in the literature.

For the interfacial process, reference may be made, for example, to H. Schnell, "Chemistry and Physics of Polycarbonates", Polymer Reviews, Vol. 9, Interscience Publishers, New York 1964 p. 33 ff., to Polymer Reviews, Vol. 10, "Condensation Polymers by Interfacial and Solution Methods", Paul W. Morgan, Interscience Publishers, New York 1965, Chap. VIII, p. 325, to Dres. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, p. 118-145 and to EP-A 0 517 044.

The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) as well as in patent specifications DE-B 10 31 512 and U.S. Pat. No. 6,228,973.

The polycarbonates are preferably prepared by reaction of bisphenol compounds with carbonic acid compounds, in particular phosgene or, in the melt transesterification process, diphenyl carbonate or dimethyl carbonate. Homopolycarbonates based on bisphenol A and copolycarbonates based on the monomers bisphenol A and 1,1-bis-(4-hydroxyphenyl)-3,3,5-trimethylcyclohexane (bisphenol TMC) are particularly preferred. These and further bisphenol and diol compounds which can be used for the polycarbonate synthesis are disclosed inter alia in WO-A 2008037364 (p. 7, l. 21 to p. 10, l. 5), EP-A 1 582 549 ([0018] to [0034]), WO-A 2002026862 (p. 2, l. 20 to p. 5, l. 14), WO-A 2005113639 (p. 2, p. 1 to p. 7, l. 20).

The polycarbonates can be linear or branched. Mixtures of branched and unbranched polycarbonates can also be used.

Suitable branching agents for polycarbonates are known from the literature and are described, for example, in patent specifications U.S. Pat. No. 4,185,009 and DE-A 25 00 092

(3,3-bis-(4-hydroxyaryl-oxindoles according to the invention, see whole document in each case), DE-A 42 40 313 (see p. 3, l. 33 to 55), DE-A 19 943 642 (see p. 5, l. 25 to 34) and U.S. Pat. No. 5,367,044 as well as in literature cited therein. The polycarbonates used can additionally be intrinsically branched, no branching agent being added here within the context of the polycarbonate preparation. An example of intrinsic branchings are so-called Fries structures, as are disclosed for melt polycarbonates in EP-A 1 506 249.

Chain terminators can additionally be used in the polycarbonate preparation. Phenols such as phenol, alkylphenols such as cresol and 4-tert-butylphenol, chlorophenol, bromophenol, cumylphenol or mixtures thereof are preferably used as chain terminators.

Polyester carbonates are obtained by reaction of the bisphenols already mentioned, at least one aromatic dicarboxylic acid and optionally carbonic acid equivalents. Suitable aromatic dicarboxylic acids are, for example, phthalic acid, terephthalic acid, isophthalic acid, 3,3'- or 4,4'-diphenyldicarboxylic acid and benzophenonedicarboxylic acids.

A portion, up to 80 mol %, preferably from 20 to 50 mol %, of the carbonate groups in the polycarbonates can be replaced by aromatic dicarboxylic acid ester groups.

There can be added to the homopolycarbonates, copolycarbonates and thermoplastic polyester carbonates according to the invention in known manner, for example by compounding, also other plastics such as aromatic polyesters such as, for example, polybutylene terephthalate or polyethylene terephthalate, polyamides, polyimides, polyester amides, polyacrylates and polymethacrylates such as, for example, polyalkyl (meth)acrylates and in particular polymethyl methacrylate, polyacetals, polyurethanes, polyolefins, halogen-containing polymers, polysulfones, polyether sulfones, polyether ketones, polysiloxanes, polybenzimidazoles, urea-formaldehyde resins, melamine-formaldehyde resins, phenol-formaldehyde resins, alkyd resins, epoxy resins, polystyrenes, copolymers of styrene or of alpha-methylstyrene with dienes or acryl derivatives, graft polymers based on acrylonitrile/butadiene/styrene or graft polymers based on acrylate rubber (see, for example, the graft polymers described in EP-A 640 655) or silicone rubbers.

It is also possible to add to the polycarbonates according to the invention and any further plastics that may be present the additives conventional for such thermoplastics, such as fillers, UV stabilisers, heat stabilisers, antistatics and pigments, in the conventional amounts; the demoulding behaviour, the flow behaviour and/or the flame resistance can optionally also be improved by addition of external demoulding agents, flow agents and/or flame retardants (e.g. alkyl and aryl phosphites, phosphates, phosphanes, low molecular weight carboxylic acid esters, halogen compounds, salts, chalk, quartz flour, glass and carbon fibres, pigments and combinations thereof). Such compounds are described, for example, in WO 99/55772, p. 15-25, EP 1 308 084 and in the appropriate chapters of "Plastics Additives Handbook", ed. Hans Zweifel, 5th Edition 2000, Hanser Publishers, Munich.

2-(2,4-Dihydroxy)phenyl-4,6-di(4-phenyl)phenyl-1,3,5-triazine is here used in amounts according to the invention of from 0.0001 wt. % to 0.1000 wt. %, preferably from 0.001 wt. % to 0.090 wt. %, in each case based on the total composition. In a further embodiment, the composition contains at least one additional UV absorber selected from the group of the compounds containing benzotriazoles and triazines in amounts of from 0.0001 to 10.0000 wt. %, based on the total composition. Where the additional UV absorber(s) are benzotriazoles, it can be preferred in particular embodiments of the invention to use preferably from 0.0001 wt. % to 0.4000 wt. %, particularly preferably from 0.0001 wt. % to 0.0500 wt. %, in each case based on the weight of the total composition.

Within the context of the present invention, additional UV absorbers from the group of the triazines are to be understood as being, for example, 2-[2-hydroxy-4-(2-ethylhexyl)oxy]phenyl-4,6-di(4-phenyl)phenyl-1,3,5-triazine (CAS No. 204583-39-1), 2-(4,6-diphenyl-1,3,5-triazin-2-yl)-5-(hexyloxy)-phenol (CAS No. 147315-50-2), 2-[4,6-bis(2,4-dimethylphenyl)-1,3,5-triazin-2-yl]-5-[2-hydroxy-3-(octyloxy)propoxy]-phenol (CAS No. 214692-65-6) and 2,4-bis(4-biphenylyl)-6-[2-hydroxy-4-[(octyloxycarbonyl)ethylideneoxy]phenyl]-s-triazine (CAS No. 304671-49-6), whereby the present invention is not to be limited by the above-mentioned list.

Within the context of the present invention, additional UV absorbers from the group of the benzotriazoles are to be understood as being, for example, 2-(2H-benzotriazol-2-yl)-4-(1,1-dimethylethyl)-6-(1-methylpropyl)-phenol (CAS No. 36437-37-3), 2,2'-methylenebis[6-(2H-benzotriazol-2-yl)-4-(1,1,3,3-tetramethylbutyl)-phenol (CAS No. 103597-45-1), 2-(2H-benzotriazol-2-yl)-4-(1,1,3,3-tetramethylbutyl)-phenol (CAS No. 3147-75-9), 2-(2H-benzotriazol-2-yl)-4,6-bis(1-methyl-1-phenylethyl)-phenol (CAS No. 70321-86-7), 2-(2H-benzotriazol-2-yl)-4,6-bis(1,1-dimethylethyl)-phenol (CAS No. 3846-71-7), whereby the present invention is not to be limited by the above-mentioned list.

Preparation of the Compositions:

The preparation of a composition containing polycarbonate and from 0.0001 wt. % to 0.1000 wt. %, preferably from 0.001 wt. % to 0.090 wt. %, 2-(2,4-dihydroxy)phenyl-4,6-di(4-phenyl)phenyl-1,3,5-triazine is carried out using conventional incorporation processes by combining, mixing and homogenising 2-(2,4-dihydroxy)phenyl-4,6-di(4-phenyl)phenyl-1,3,5-triazine with polycarbonate, the homogenisation in particular preferably being carried out in the melt under the action of shear forces. The combination and mixing before the melt homogenisation are optionally carried out using powder premixtures. It is also possible to use premixtures which have been prepared from solutions of the mixture components in suitable solvents, homogenisation optionally being carried out in solution and the solvent subsequently being removed. In this connection, the composition can be combined, mixed, homogenised and then extruded in conventional devices such as screw extruders (for example twin-screw extruders, ZSK), kneaders, Brabender or Banbury mills. After the extrusion, the extrudate can be cooled and comminuted. It is also possible to mix individual components beforehand and then add the remaining starting materials individually and/or likewise in mixture form. In a further embodiment, so-called recyclate containing one or more of the UV absorbers according to the invention can be used.

The recyclate is formed by grinding/shredding extruded sheets based on polycarbonate which, for example because of high quality requirements, are not suitable for many an application.

Preparation of Coextruded Sheets:

Within the context of the present invention, sheets comprising base layer and optional cover layer/cover layers are preferably produced by (co)extrusion. For the extrusion, the thermoplastic granulate, which has optionally been pre-treated, for example by means of drying, is fed to the extruder and melted in the plastification system of the extruder. The plastics melt is then forced through a slot die or a multi-wall sheet die and thereby shaped, is brought to the desired final form in the roll gap of a smoothing calender, and its shape is fixed by alternate cooling on smoothing rollers and with ambient air. The temperatures necessary for extrusion of the polycarbonate are set, it usually being possible to follow the manufacturer's instructions. The polycarbonates having a high melt viscosity used for the extrusion are, for example, normally processed at melt temperatures of from 260° C. to 320° C., and the cylinder temperatures of the plastification cylinder and the die temperatures are set accordingly.

By using one or more side extruders and a multiple manifold die or optionally suitable melt adapters upstream of a flat die it is possible to lay thermoplastic melts of different compositions above one another and accordingly produce multilayer sheets or films (for coextrusion see, for example, EP-A 0 110 221, EP-A 0 110 238 and EP-A 0 716 919, for details of the adapter and die process see Johannaber/Ast: "Kunststoff-Maschinenführer", Hanser Verlag, 2000 and Gesellschaft Kunststofftechnik: "Coextrudierte Folien und Platten: Zukunftsperspektiven, Anforderungen, Anlagen und Herstellung, Qualitätssicherung", VDI-Verlag, 1990).

The machines and apparatuses used within the context of the present invention for the production of coextruded polycarbonate solid sheets are described in greater detail in the examples part.

EXAMPLES a) Tests a.1) Weathering:

Weathering of the colour sample sheets (opt. quality; 60×40×4 mm; the granulate is dried for 3 hours at 120° C. In vacuo and then injection moulded on an injection-moulding machine at a melt temperature of 300° C. and a tool temperature of 90° C.) produced from the materials of Examples 1 to 4 and of the sawn sheets of Examples 7 to 10 was carried out in an Atlas Ci 65 A Weatherometer with a radiation intensity of 0.5 W/m$^2$ at 340 nm and a dry/rain cycle of 102:18 minutes according to ISO 4892-2A. The black panel temperature is 65° C., the sample chamber temperature is 42° C. and the humidity is 50±10%.

a.2) The yellowness index YI was measured using a Hunter UltraScanPRO colour measuring device and calculated according to ASTM E313.

a.3) Film Test by Measuring the Amount of Condensate:

The amount of condensate is determined by weighing an aluminium foil with and without a film. The amount of film is defined as follows: amount of condensate in %=(wt. foil of the measurement−foil before measurement)/sample weight.

Description of the Procedure in Detail:

After drying (120° C., 4 hours), 20 g of the granulate (Examples 1 to 6) are introduced into an aluminium dish having a diameter of 80 mm and a depth of 15 mm, in such a manner that the bottom of the dish is covered evenly with granulate. The filled dish is introduced into a sample chamber (85 mm diameter, 50 mm depth) of an electrically heatable metal block provided therefor and is closed with an aluminium foil of thickness 0.03 mm and diameter 100 mm. In order that the volatile constituents are able to condense on the foil, it is cooled by a cooling plate during the measurement. The temperature of the cooling water is set at 20° C. When carrying out the measurement it is to be ensured that the foil seals the sample chamber well to the outside.

The metal block is heated to a temperature of 300° C. In a period of a few minutes. The sample remains at that temperature for 4 hours, and then the test apparatus is cooled down to ambient temperature. When ambient temperature has been reached, the aluminium foil is removed and weighed on a microbalance, and the amount of condensate is calculated according to the definition.

b) Preparation of the UV Absorber b.1) Preparation of 2-chloro-4,6-di-biphenyl-1,3,5-triazine 3.6 g (0.147 mol) of activated magnesium turnings are suspended in 50 ml of abs. THF in a heated glass apparatus. A grain of iodine is added. Heating is subsequently carried out briefly to 60° C., under argon, and then both the stirrer and the heat source are switched oft 34.3 g (0.147 mol) of 4-bromo-biphenyl dissolved in absolute THF are then carefully added dropwise. The mixture is then heated for 2 hours under reflux.

After cooling, the Grignard solution is added dropwise (at about 50° C.) to a solution of 9.2 g (0.05 mol) of cyanuric chloride dissolved in 50 ml of absolute THF (in a thy glass apparatus). After 4 hours, 100 ml of toluene are added and the mixture is added to 50 ml of 12% HCl solution. The solid is filtered off and the residue is washed with water. 10.3 g are obtained in the form of beige-coloured crystals.

b.2) Preparation of 2-(2,4-dihydroxyphenyl)-4,6-di-biphenyl-1,3,5-triazine 8.9 g (0.021 mol) of 2-chloro-4-6-di-biphenyl-1,3,5-triazine (b.1) are suspended in 100 ml of toluene. A spatula tip of AlCl$_3$ is added. The solution is heated to 100° C. 2.35 g (0.021 mol) of resorcinol are added in portions. Heating is carried out for 12 hours under reflux. The reaction mixture is poured onto ice/water. The product is filtered off and washed with water.

$^1$H-NMR (400 MHz; tetrachloroethane-d2): δ=13.3 (s, 1H); 8.70-8.65 (m, 5H); 7.83-7.80 (m, 4H); 7.70-7.65 (m, 4H); 7.50-7.40 (m, 6H); 6.53-6.50 (m, 2H), 5.05 (s, 1H).

c) Compounding and Testing of Polycarbonate Compositions:

The device for compounding consists of:

Metering Device for the Components a co-rotating twin-shaft extruder (ZSK 53 from Werner & Pfleiderer) with a screw diameter of 53 mm, a perforated die for forming melt strands, a water bath for cooling and solidifying the strands, a granulator.

The following compositions are prepared using the above-described compounding device. The melt temperature was in each case between 330° C. and 335° C.

Example 1

Comparison Example

Makrolon® 3108 from Bayer MaterialScience AG, a linear homopolycarbonate, without additive, based on bisphenol A having a melt flow index (MFR) according to ISO 1133 of 6.5 g/10 min at 300° C. and 1.2 kg load, is subjected to a film test at 300° C. as described above. The results are listed in Table 1.

Example 2

Comparison Example 99.95 wt. % Makrolon® 3108 from Bayer MaterialScience AG are compounded with 0.05 wt. % Tinuvin® 1577 (2-(4, 6-diphenyl-1,3,5-triazin-2-yl)-5-(hexyloxy)-phenol (CAS No. 147315-50-2)) from Ciba Inc. under the conditions described above, and the compound is subjected to a film lest as described in Example 1. The results are listed in Table 1.

Example 3

Comparison Example 99.95 wt. % Makrolon® 3108 from Bayer MaterialScience AG are compounded with 0.05 wt. % Tinuvin® 329 (2-(2'- hydroxy-5'-(tert-octyl)-phenyl)-benzotriazole (CAS No. 3147-75-9)) from Ciba Inc. under the conditions described above, and the compound is subjected to a film test as described in Example 1.

Example 4

According to the Invention 99.95 wt. % Makrolon® 3108 from Bayer MaterialScience are compounded with 0.05 wt. % 2-(2,4-dihydroxy)phenyl-4,6-di(4-phenyl)phenyl-1,3,5-triazine under the conditions described above, and the compound is subjected to a film test as described in Example 1.

Example 5

According to the Invention 99.90 wt. % Makrolon® 3108 from Bayer MaterialScience are compounded with 0.05 wt. % Tinuvin® 1577 (2-(4,6-diphenyl-1,3,5-triazin-2-yl)-5-(hexyloxy)-phenol (CAS No. 147315-50-2)) from Ciba Inc. and 0.05 wt. % 2-(2,4-dihydroxy)phenyl-4,6-di(4-phenyl)phenyl-1,3,5-triazine under the conditions described above, and the compound is subjected to a film test as described in Example 1.

Example 6

According to the Invention 99.90 wt. % Makrolon® 3108 from Bayer MaterialScience are compounded with 0.05 wt. % Tinuvin® 329 (2-(2'-hydroxy-5'-(tert-octyl)-phenyl)-benzotriazole (CAS No. 3147-75-9)) from Ciba Inc. and 0.05 wt. % of 2-(2,4-dihydroxy)phenyl-4,6-di(4-phenyl)phenyl-1,3,5-triazine under the conditions described above, and the compound is subjected to a film test as described in Example 1.

The results of the film tests using the granulates from Examples 1 to 6 are listed in Table 1.

TABLE 1

Results of the film tests

| | Example 1 | Example 2 | Example 3 | Example 4 | Example 5 | Example 6 |
|---|---|---|---|---|---|---|
| Amount of film [%] | 0.021 | 0.024 | 0.060 | 0.016 | 0.023 | 0.040 |

The change in the yellowness index ($\Delta YI$) in dependence on the weathering time is shown in Table 2 below. The YI was measured on a Hunter UltraScanPRO colour measuring device.

TABLE 2

Change in the yellowness index ($\Delta YI$) of the colour sample plates in dependence on the weathering time

| | Time in h | | |
|---|---|---|---|
| | 0 | 700 | 5600 |
| Example 1 | 0.0 | 8.9 | 20.64 |
| Example 2 | 0.0 | 3 | 13.04 |
| Example 3 | 0.0 | 3.5 | 14.79 |
| Example 4 | 0.0 | 1.3 | 9.82 | d) Production and Testing of Polycarbonate Solid Sheets with Coextruded Layers d.1) Materials Used The material used for the base layer of the solid sheets was in each case a material compounded from 99.95 wt. % Makrolon® 3108 and 0.05 wt. % Tinuvin® 329. In contrast to the production of the other compounds mentioned above, the production of this compound was carried out using a conventional twin-screw compounding extruder (ZSK 32) at conventional processing temperatures for polycarbonate of from 280 to 335° C.

Makrolon® 3108 as well as the polycarbonate compositions of Examples 2, 3 and 4 were each used to produce the coextruded layers on one side of polycarbonate solid sheets.

The following materials were used for the coextruded layer on one side:

Example 7

Comparison Example

Makrolon® 3108 was used.

Example 8

Comparison Example

The compound containing 0.05 wt. % Tinuvin® 1577 from Example 2 was used.

Example 9

Comparison Example

The compound containing 0.05 wt. % Tinuvin® 329 from Example 3 was used.

Example 10

According to the Invention

The compound containing 0.05 wt. % 2-(2,4-dihydroxy)phenyl-4,6-di(4-phenyl)phenyl-1,3,5-triazine from Example 4 was used.

d.2) Description of the Coextrusion Process 4 mm polycarbonate solid sheets having a 50 μm thick coextruded layer on one side were produced using the following machines and apparatuses:
- the main extruder with a screw of length 33 D and a diameter of 70 mm with degassing
- a 2-layer coextrusion adapter (fixed adapter from Bexsol, Italy)
- a coextruder for application of the cover layer with a screw of length 25 D and a diameter of 35 mm
- a special flat coextrusion die with a width of 430 mm
- a smoothing calender
- a roller conveyor
- a take-off device
- a device for cutting to length (saw)
- a delivery table.

The solid sheets provided with a coextruded layer on one side were produced as follows: The polycarbonate granulate of the base material was fed to the filling hopper of the main extruder and melted and conveyed via the cylinder/screw. The temperatures of the individual casing of the main extruder were from 230° C. to 290° C. and the resulting melt temperature was about 300° C. The shaft speed was between 50 and 56 rpm. The material for the coextruded layer on one side was fed via the filling hopper of the coextruder. The melt temperature of the coextruder was about 285° C. The sheets extruded by means of this die have a thickness of about 4 mm and a sheet width of 400 mm.

d.3) Testing of the Sheets

Small sheets measuring 60×40×4 mm were sawn from the sheets and weathered exactly like the colour sample sheets made from the compounds of Examples 1 to 4 (with the side with the coextruded layer facing the weathering lamp).

The change in the yellowness index (ΔYI) in dependence on the weathering time is shown in Table 3 below:

TABLE 3

Change in the yellowness index (Δ YI) of the coextruded sheets in dependence on the weathering time

| | Time in h | | |
|---|---|---|---|
| | 0 | 700 | 2800 |
| Example 7 | 0.0 | 3.6 | 11.1 |
| Example 8 | 0.0 | 3.3 | 10.2 |
| Example 9 | 0.0 | 3.7 | 11.3 |
| Example 10 | 0.0 | 3.1 | 9.6 |

The examples show the high effectiveness of the dihydroxytriazine as a UV protective agent in extruded sheets. At the same time, a low evaporation tendency is achieved by the use of dihydroxytriazine. This is true not only when this compound is used on its own but also in particular in combination with other UV absorbers, in particular with benzotriazoles and/or other triazine compounds.

The invention claimed is:

1. A composition comprising polycarbonate and from 0.0001 weight % to 0.1000 weight % of 2-(2,4-dihydroxy)phenyl-4,6-di(4-phenyl)phenyl-1,3,5-triazine.

2. The composition of claim 1, further comprising from 0.0001 weight % to 10.0000 weight % of at least one further UV absorber.

3. The composition of claim 1, wherein the at least one further UV absorber is selected from the group consisting of benzotriazoles and triazines.

4. The composition of claim 3, wherein the composition contains from 0.0001 weight % to 10.000 weight %, based on the total weight of the composition, of at least one UV absorber from the group of the benzotriazoles.

5. A moulding comprising the composition of claim 1.

6. The moulding of claim 5, wherein the moulding is produced by extrusion or by injection-moulding.

7. The moulding of claim 5, wherein the moulding is a single-layer or multi-layer solid, multi-wall or corrugated sheet, wherein one or more of the layers of the sheet comprises the composition of claim 1.

8. The moulding of claim 7, wherein the moulding is a multi-layer sheet, wherein at least one layer comprising the composition of claim 1 is produced by coextrusion.

9. A high optical quality moulding comprising the composition of claim 1.

10. The composition of claim 1, wherein said composition comprises from 0.001 weight % to 0.090 weight % of 2-(2,4-dihydroxy)phenyl-4,6-di(4-phenyl)phenyl-1,3,5-triazine.

11. The composition of claim 3, wherein said composition comprises from 0.0001 weight % 0.4000 weight %, based on the total weight of the composition, of at least one UV absorber selected from the group consisting of benzotriazoles.

12. The composition of claim 3, wherein said composition comprises from 0.001 weight % to 0.050 weight %, based on the total weight of the composition, of at least one UV absorber selected from the group consisting of benzotriazoles.

* * * * *